(12) United States Patent
Li et al.

(10) Patent No.: US 11,982,831 B2
(45) Date of Patent: May 14, 2024

(54) ANTI-PEEPING BACKLIGHT MODULE

(71) Applicant: MAANSHAN-JINGZHI TECHNOLOGY CO LTD, Anhui (CN)

(72) Inventors: Tong Li, Jiangsu (CN); Peng Wu, Jiangsu (CN); Yimin Chen, Jiangsu (CN)

(73) Assignee: MAANSHAN-JINGZHI TECHNOLOGY CO LTD, Anhui (CN)

( * ) Notice: Subject to any disclaimer, the term of this patent is extended or adjusted under 35 U.S.C. 154(b) by 0 days.

(21) Appl. No.: 18/267,097

(22) PCT Filed: Nov. 9, 2021

(86) PCT No.: PCT/CN2021/129496
§ 371 (c)(1),
(2) Date: Jun. 14, 2023

(87) PCT Pub. No.: WO2022/127444
PCT Pub. Date: Jun. 23, 2022

(65) Prior Publication Data
US 2024/0012192 A1    Jan. 11, 2024

(30) Foreign Application Priority Data
Dec. 15, 2020    (CN) .......................... 202011473055.6

(51) Int. Cl.
*F21V 8/00*    (2006.01)

(52) U.S. Cl.
CPC ......... *G02B 6/0053* (2013.01); *G02B 6/0046* (2013.01); *G02B 6/0076* (2013.01)

(58) Field of Classification Search
CPC . G02B 6/00533; G02B 6/0046; G02B 6/0076
(Continued)

(56) References Cited

U.S. PATENT DOCUMENTS 5,956,107 A     9/1999   Hashimoto et al.
10,705,283 B2 *  7/2020  Liu ...................... G02B 6/0053
(Continued)

FOREIGN PATENT DOCUMENTS

CN         1987606      6/2007
CN         103226261    7/2013
(Continued)

OTHER PUBLICATIONS

"International Search Report (Form PCT/ISA/210) of PCT/CN2021/129496", dated Jan. 24, 2022, with English translation thereof, pp. 1-5.

*Primary Examiner* — Laura K Tso
(74) *Attorney, Agent, or Firm* — JCIPRNET

(57) ABSTRACT

An anti-peeping backlight module is formed by stacking an upper backlight module, a lower backlight module and a reflecting film disposed below the lower backlight module, wherein the upper backlight module is a transparent module, the lower backlight module is a transparent module or a non-transparent module, the upper backlight module is a collimating backlight module or a diffusion backlight module, the lower backlight module is a collimating backlight module or a diffusion backlight module, and the upper backlight module and the lower backlight module have different properties. The anti-peeping backlight module realizes beam splitting and collimation and can be used as various backlight modules, the beam splitting angle is adjustable, the efficiency is high, and can be controlled independently.

17 Claims, 9 Drawing Sheets

(58) Field of Classification Search
USPC .......................................................... 362/606
See application file for complete search history.

(56) References Cited

U.S. PATENT DOCUMENTS

| | | | | |
|---|---|---|---|---|
| 2006/0056166 | A1* | 3/2006 | Yeo ...................... | G02B 6/0051 |
| | | | | 362/624 |
| 2012/0032997 | A1* | 2/2012 | Cha ...................... | G02B 6/0076 |
| | | | | 362/606 |
| 2012/0235891 | A1* | 9/2012 | Nishitani .............. | G02F 1/1323 |
| | | | | 345/102 |

FOREIGN PATENT DOCUMENTS

| | | |
|---|---|---|
| CN | 105065976 | 11/2015 |
| CN | 106597599 | 4/2017 |
| CN | 109870836 | 6/2019 |
| CN | 112882286 | 6/2021 |

* cited by examiner

ANTI-PEEPING BACKLIGHT MODULE

CROSS-REFERENCE TO RELATED APPLICATION

This application is a 371 of international application of PCT application serial no. PCT/CN2021/129496, filed on Nov. 9, 2021, which claims the priority benefit of China application no. 202011473055.6, filed on Dec. 15, 2020. The entirety of each of the above mentioned patent applications is hereby incorporated by reference herein and made a part of this specification.

TECHNICAL FIELD

The invention relates to a backlight module for liquid crystal displays, in particular, to an anti-peeping backlight module.

DESCRIPTION OF RELATED ART

In recent years, liquid crystal displays have been widely applied to various display devices and become increasingly closer to people' life. The liquid crystal display cannot emit light, so it needs to be equipped with a backlight module for providing backlight. In some special application scenarios or in occasions where users have anti-peeping requirements, anti-peeping screens are used by users to prevent information on their screen from being seen by others. At present, there are two types of anti-peeping screens: static anti-peeping screens and dynamic anti-peeping screens. The static anti-peeping screens are realized through grating structures, which are arranged in parallel and prevent light, passing through the screens, from being refracted out at a certain angle. Although the static anti-peeping screens can realize an anti-peeping effect at certain angles, they have a low overall transmittance and are relatively dark, which leads to poor user experience. Also, the static anti-peeping screens cannot realize the anti-peeping display and a wide-angle display at the same time. The second type of anti-peeping screen are dynamic anti-peeping screens, which are realized mainly in the following ways:

1) A 3M anti-peeping film is disposed in a common backlight module, a Polymer Dispersed Liquid Crystal (PDLC) or smectic dimming film is disposed between the 3M anti-peeping film and a display screen, and switching between an anti-peeping mode and a sharing mode is realized by switching the dimming film to a fully transparent state or a scattering state. This scheme has the following problems: the price of the 3M anti-peeping film is high, the vision disparity of the PDLC in the fully transparent state compromises the anti-peeping effect; and the smectic dimming film has a high driving voltage and has an excessively low response speed at a low temperature.
2) A PDLC or smectic dimming film is disposed in a collimating backlight module; however, this scheme has the problem of high cost and low yield of collimating backlight.
3) An anti-peeping display system based on a liquid crystal light valve can realize quick switching between an anti-peeping display state and a sharing display state through two pairs of electrodes, which are in different forms and disposed on two sides of the liquid crystal light valve. However, this scheme has a requirement for the angle of incident light and causes an efficiency loss.

In the above schemes, the emergent angle is fixed within a certain range in one dimension, two-dimensional peep prevention cannot be realized, and the range of the incidence angle cannot be adjusted, so the application range is limited.

BRIEF SUMMARY OF THE INVENTION

The technical issue to be solved by the invention is to provide an anti-peeping backlight module, which can realize an adjustable angle and two-dimensional peep prevention, can realize quick switching between an anti-peeping display mode and a wide-angle display mode and give a response instantly, and has a high overall transmittance.

The technical solution adopted by the invention to settle the above technical issue is as follows: an anti-peeping backlight module is formed by stacking an upper backlight module, a lower backlight module and a reflecting film disposed below the lower backlight module, wherein the upper backlight module is a transparent module, the lower backlight module is a transparent module or a non-transparent module, the upper backlight module is a collimating backlight module or a diffusion backlight module, the lower backlight module is a collimating backlight module or a diffusion backlight module, and the upper backlight module and the lower backlight module have different properties.

The collimating backlight module comprises a first light guide plate and a first light source disposed on a side surface of the first light guide plate, a first micro-prism array is disposed on an upper surface of the first light guide plate and is arranged along a light transmission direction of the first light source, the diffusion backlight module comprises a second light guide plate and a second light source disposed on a side surface of the second light guide plate, a second micro-prism array is disposed on an upper surface of the second light guide plate and is arranged along a light transmission direction of the second light source.

The upper backlight module is the collimating backlight module, the lower backlight module is the diffusion backlight module, and the first micro-prism array and the second micro-prism array are orthogonal or parallel to each other.

The upper backlight module is the diffusion backlight module, the lower backlight module is the collimating backlight module, and the first micro-prism array and the second micro-prism array are orthogonal or parallel to each other.

The first light guide plate is a parallel plate, the first light source is disposed on a side surface of the first light guide plate, and a first reflecting surface is disposed on a side surface of the first light guide plate opposite to the first light source.

The first light guide plate is a parallel plate, the first light source is disposed on a side surface of the first light guide plate, and a first auxiliary light source is disposed on a side surface of the first light guide plate opposite to the first light source.

The first light guide plate is a wedge-shaped plate, and the first light source is disposed on a side surface of a thick end of the wedge-shaped plate. A wedge angle of the wedge-shaped plate is less than or equal to 5°.

A reflecting surface is disposed on a side surface of a tail end of the wedge-shaped plate. The first light guide plate is a bidirectional wedge-shaped plate, and the first light sources are disposed on side surfaces of two thick ends of the wedge-shaped plate.

The first micro-prism array is of a trapezoidal-shaped structure or a cup-shaped structure and is integrated with the first light guide plate.

The first micro-prism array is arranged regularly or irregularly.

Lights entering the first micro-prism array from the first light guide plate are refracted out of the first micro-prism array in a convergent manner.

The second light guide plate is a parallel plate, the second light source is arranged on a side surface of the second light guide plate, and a second reflecting surface is disposed on a side surface of the second light guide plate opposite to the second light source.

The second light guide plate is a parallel plate, the second light source is disposed on a side surface of the second light guide plate, and a second auxiliary light source is disposed on a side surface of the second light guide plate opposite to the light source.

Lights entering the second micro-prism array from the second light guide plate are refracted out of the second micro-prism array in a divergent manner.

An anti-peeping film is attached to an upper surface of the lower backlight module, and an air gap is reserved between the anti-peeping film and a lower surface of the upper backlight module.

A lower interface of the bidirectional wedge-shaped light guide plate is linear or nonlinear.

The contour of side surfaces of the first micro-prism array and the second micro-prism is linear, arc-shaped, or multi-segmental.

The arc-shaped or multi-segmental contour is concave (converged), convex (diverged), or concave and convex.

The upper backlight module is the diffusion backlight module, the lower backlight module is the collimating backlight module, the collimating backlight module comprises a first light guide plate and a first light source, the diffusion back light module comprises a second light guide plate and a second light source, the second light guide plate is a parallel plate, a second micro-prism array is disposed on an upper surface of the second light guide plate and is arranged along a light transmission direction of the second light source, the second light source is disposed on a side surface of the second light guide plate, a second auxiliary light source is disposed on a side surface of the second light guide plate opposite to the second light source, the first light guide plate is a wedge-shaped plate, the first light source is disposed on a side surface of a thick end of the wedge-shaped plate, and a rhombic prism film is disposed between the first light guide plate and the second light guide plate.

The upper backlight module is the diffusion backlight module, the lower backlight module is the collimating backlight module, the collimating backlight module comprises a first light guide plate and a first light source, the diffusion back light module comprises a second light guide plate and a second light source, the second light guide plate is a parallel plate, a second micro-prism array is disposed on an upper surface of the second light guide plate and is arranged along a light transmission direction of the second light source, the second light source is disposed on a side surface of the second light guide plate, a second auxiliary light source is disposed on a side surface of the second light guide plate opposite to the second light source, the first light guide plate is a wedge-shaped plate, the first light source is disposed on a side surface of a thick end of the wedge-shaped plate, and a reversed prism film is disposed between the first light guide plate and the second light guide plate.

An anti-peeping film is disposed between the reversed prism film and the second light guide plate.

Compared with the prior art, the invention has the following advantages: the anti-peeping backlight module can realize beam splitting and collimation and can be used as various backlight modules. The beam splitting angle can be adjusted, the efficiency is high, and can be independently controlled. The beam splitting function is realized through the design of light incidence and incident heads on both sides, and through the design of the micro-prism structure on the light-emitting surface, such as gradual densification from the edge to the center to achieve uniform light output, to solve the problem that the color in the middle of the traditional panel is light and not bright enough.

BRIEF DESCRIPTION OF THE SEVERAL VIEWS OF DRAWINGS

DETAILED DESCRIPTION OF THE INVENTION

The invention will be described in further detail below in conjunction with the accompanying drawings and embodiments.

Embodiment: A backlight module with a controllable light angle is formed by stacking an upper backlight module, a lower backlight module and a reflecting film disposed below the lower backlight module, wherein the upper backlight module is a transparent module, the lower backlight module is a transparent module or a non-transparent module, the upper backlight module is a collimating backlight module or a diffusion backlight module, the lower backlight module is a collimating backlight module or a diffusion backlight module, the upper backlight module and the lower backlight module have different properties, the collimating backlight module comprises a first light guide plate and a first light source disposed on a side surface of the first light guide plate, a first micro-prism array is disposed on an upper surface of the first light guide plate and is arranged along a light transmission direction of the first light source, the diffusion backlight module comprises a second light guide plate and a second light source disposed on a side surface of the second light guide plate, and a second micro-prism array is disposed on an upper surface of the second light guide plate and is arranged along a light transmission direction of the second light source.

Figure 1:
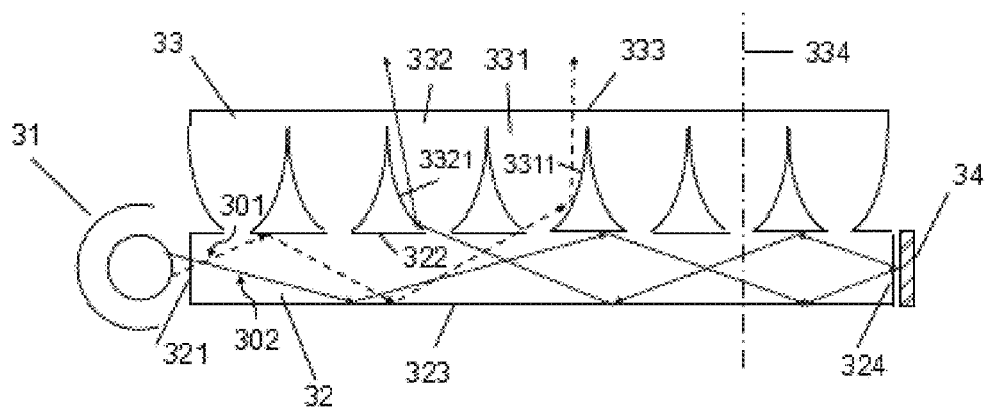
FIG. 1 is a schematic diagram of an optical path of a first structure of a single-light source collimating backlight module in Example 1 of an embodiment of the invention.

Example 1: Single-Light Source Collimating Backlight Module or Diffusion Backlight Module Referring to FIG. 1 which is a schematic diagram of a first structure of a single-light source collimating backlight module, a first light guide plate 32 is a parallel plate, a first micro-prism array 33 is disposed on the surface of the first light guide plate 32, a first light source 31 is disposed on a side surface 321 of the first light guide plate 32, a first reflecting film 34 is disposed on a side surface 324 opposite to the first light source 31, the surface of the first reflecting film 34 is a first reflecting surface with a certain reflectivity, and matrices of the first light guide plate 32 and the first micro-prism array 33 are optical materials.

As can be seen from the figure, after a light 301 emitted by the first light source 31 enters the first light guide plate 32 from the side surface 321, according to the Snell's law ($n_1 \sin \theta_1 = n_2 \sin \theta_2$, where $n_1$ is the refractivity of a medium 1, $\theta_1$ is an incidence angle, $n_2$ is the refractivity of a medium 2, and $\theta_2$ is a refraction angle), the light 301 is continuously reflected between an upper interface 322 and a lower interface 323 and travels forward until it is refracted into a micro-prism 331 from a lower opening of the first micro-prism array 33 and is then refracted by a side surface 3311 of the micro-prism 331 out of a surface 333 of the micro-prism 331 of the first micro-prism array 33. After a light 302 emitted by the first light source 31 enters the first light guide plate 32, according to the Snell's law, the light 302 is continuously reflected between the upper interface 322 and the lower interface 323 and travels forward; because the light 302 does not encounter the first micro-prism array 33 when traveling forward, it is reflected by the first reflecting film 34 on the side surface 324 and then travels in the first light guide plate 32 in the reverse direction. When traveling back, the reflected light 302 encounters the lower end of a micro-prism 332, enters the micro-prism 332, and is refracted by a side surface 3321 of the micro-prism 332 out of the surface 333 of the first micro-prism array 33.

Figure 2:
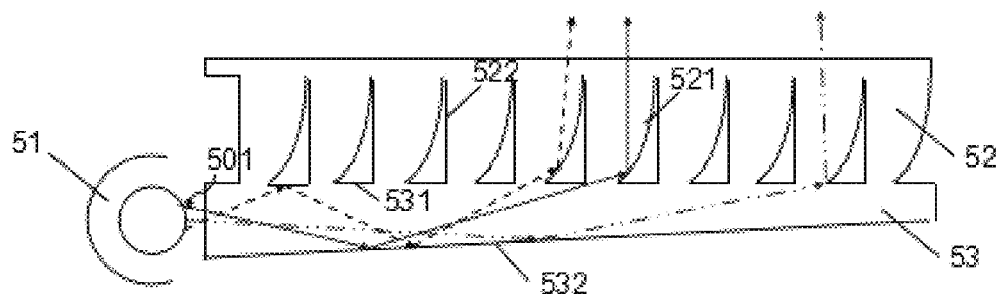
FIG. 2 is a schematic diagram of an optical path of a second structure of the single-light source collimating backlight module in Example 1 of the embodiment of the invention.

Referring to FIG. 2 which is a schematic diagram of a second structure of the single-light source collimating backlight module, a first light guide plate 53 is of a wedge-shaped structure, and a first light source 51 is disposed at a thick end of the wedge-shaped plate (normal wedge-shaped plate). Assume the refractivity of the first light guide plate 53 is 1.58, the angle of a light entering the wedge-shaped plate is $\alpha = \pm \arcsin(1/1.58) = \pm 40°$, when the light travels in the wedge-shaped plate, a normal angle 90-$\alpha$ between the light and upper and lower reflecting surfaces of the wedge-shaped plate is greater than or equal to 50°, a total reflection angle is $\gamma = \arcsin(1/1.58) = 40°$, and the light meets the total reflection condition when 90-$\alpha$ is greater than $\gamma$, and thus will not be transmitted out of the light guide plate. The angle of the wedge-shaped plate is $\beta$, and the normal angle between the light and an upper interface 531 or a lower interface 532 of the wedge-shaped plate will be decreased by $\beta$ every time the light is reflected by the upper interface 531 or the lower interface 532, until the light meets an outgoing condition and is transmitted out of the light guide plate. In this solution, the wedge angle $\beta$ of the first light guide plate 53 is small, so most light energy (such as light 501) can meet the total reflection condition and be enveloped by the upper interface 531 and the lower interface 532 in the traveling process; and because the light travels in one direction in this example, the first micro-prism array 52 is arranged linearly (asymmetrically), the light will not be refracted by one side surface 521 of one micro-prism out of the backlight module until it is irradiated to a lower opening of the micro-prism structure, and will not be refracted by the other side surface 522 of the micro-prism.

Figure 3:
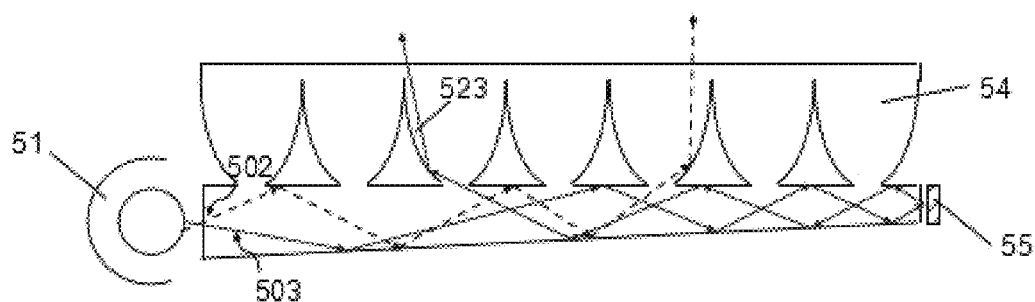
FIG. 3 is a schematic diagram of an optical path of a third structure of the single-light source collimating backlight module in Example 1 of the embodiment of the invention.

Referring to FIG. 3 which is a schematic diagram of a third structure of the single-light source collimating backlight module, a first reflecting film 55 is disposed at a tail end of a wedge-shaped light guide plate to allow light to be transmitted out of the backlight module in two directions, a first micro-prism array 54 is arranged symmetrically, a light 502 from the light source 51 is transmitted out in a way similar to that of the light 501 in FIG. 2, while a light (such as light 503) which does not encounter the lower opening of the first micro-prism array 54 in the traveling process is reflected by a first reflecting film 55 on an end surface of the wedge-shaped plate back into the wedge-shaped plate, the reflection and traveling process of the returned light between the upper interface 531 and the lower interface 532 of the wedge-shaped plate is exactly opposite to the reflection and traveling process in the forward direction (inverted wedge-shaped plate), that is, the normal angle between the light and the upper interface 531 or the lower interface 532 will be increased by β every time the light is reflected by the upper interface 531 or the lower interface 532, until the returned light encounters the lower opening of the first micro-prism array 54 and is refracted by a side surface 523 of one micro-prism out of the first micro-prism array 54.

Figure 4:
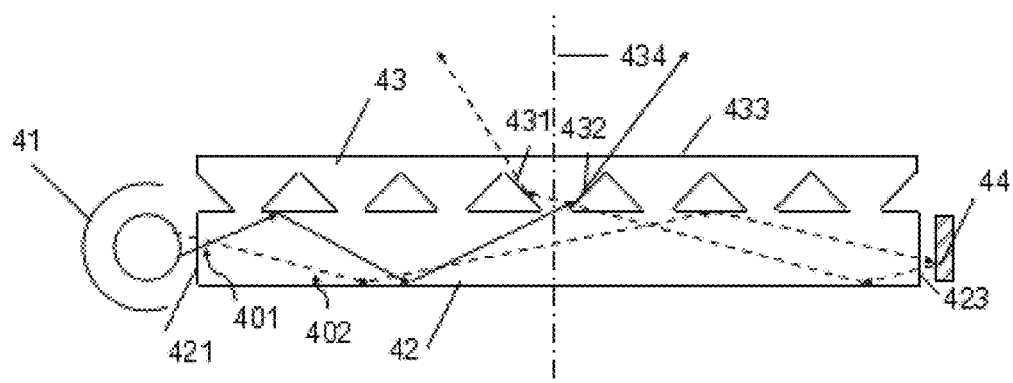
FIG. 4 is a schematic diagram of a structure of a single-light source diffusion backlight module in Example 1 of the embodiment of the invention.

Referring to FIG. 4 which is a structural diagram of a single-light source diffusion backlight module, two side surfaces of micro-prisms of a second micro-prism array 43 are designed to refract lights in different directions which are symmetric (or asymmetric) with respect to the normal of the surface of the second micro-prism array 43. Lights 401 and 402 emitted by a second light source 41 enter a second light guide plate 42 from a side surface 421 and then travel forward in the second light guide plate 42, wherein the light 401 encounters a lower opening of the micro-prism array and is then refracted by a side edge 432 out of the backlight module. The light 402 does not encounter the lower opening of the micro-prism array when traveling forward in the second light guide plate 42 and is refracted, by a second reflecting film 44 on a side surface 423 of the second light guide plate 42, back into the second light guide plate 42 to travel in the reverse direction, and in the process of traveling in the same direction as the light 401, the light 402 encounters the lower opening of the micro-prism array and is refracted by a side edge 431 of one micro-prism out of the backlight module. By changing the contour of the side surfaces of the micro-prisms, the light 401 and the light 402, which travel in the same direction, are refracted by the micro-prism in two different directions, such that there is no light in the direction of a normal 434 of a surface 433 of the second micro-prism array 43, and the lights are distributed on the two sides of the direction of the normal 434 of the surface 433 of the second micro-prism array 43. The divergence degree (range) of the lights can be controlled by changing the contour of the side surfaces of the micro-prisms.

Example 2: Double-Light Source Collimating Backlight Module or Diffusion Backlight Module Referring to FIG. 5 which is a schematic diagram of a first structure of a double-light source collimating backlight module, the first light guide plate 32 is a parallel plate, the first micro-prism array 33 is disposed on the surface of the first light guide plate 32, the first light source 31 is disposed on the side surface 321 of the first light guide plate 32, and a first auxiliary light source 35 is disposed on the side surface 324 of the first light guide plate 32 opposite to the first light source 31. Substrates of the first light guide plate 32 and the first micro-prism array 33 are optical materials.

Figure 6:
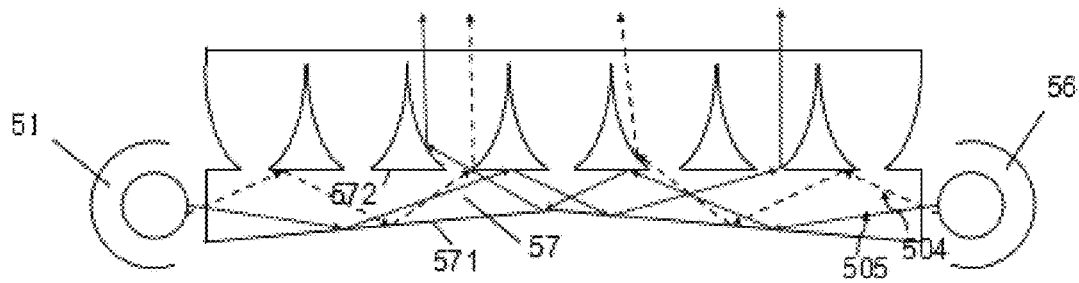
FIG. 6 is a schematic diagram of an optical path of a second structure of the double-light source collimating backlight module in Example 2 of the embodiment of the invention.

As can be seen from the figure, lights emitted by two light sources travel in the same direction and are transmitted out in the same way as lights in FIG. 2. In FIG. 6, the side surfaces of the micro-prisms may be designed to enable lights transmitted out of the backlight module to be distributed with a normal 334 of an light-emitting surface 333 as the center, that is, the emergent ranges of the lights traveling in two directions are overlapped, for example, the distribution ranges of lights 301 and 302 and lights 303 and 304 are overlapped.

Referring to FIG. 6 which is a schematic diagram of a second structure of the double-light source collimating backlight module, a first guide plate 57 is formed by two linear wedge-shaped plate structures with thin ends being connected, such that lights can be transmitted out of the backlight module in two directions. In this case, the first micro-prism array is arranged symmetrically. Specifically, when a light 504 emitted by a first auxiliary light source 56 enters the linear wedge-shaped plate, and the light first encounters the wedge-shaped plate structure with the thickness becoming smaller (normal wedge-shaped plate structure), and is refracted and travels between an upper interface 571 and a lower interface 572; the angle of the wedge-shaped plate is β, and the normal angle between the light and the upper interface 571 or the lower interface 572 of the wedge-shaped plate will be decreased by β every time the light is reflected by the upper interface 571 or the lower interface 572 until the light meets the outgoing condition and is transmitted out of the light guide plate. In this solution, the wedge angle β of the wedge-shaped light guide plate is small, so most light energy (such as light 504) can meet the total reflection condition and be enveloped by the upper interface 571 and the lower interface 572 in the traveling process, and the light will not be refracted by a side surface 522 of one micro-prism out of the backlight module until it is irradiated to a lower opening of the first micro-prism structure. A light which does not encounter the lower opening of the first micro-prism array in the wedge-shaped plate structure with the thickness becoming smaller continues to travel forward to enter the wedge-shaped plate structure with the thickness becoming larger (inverted wedge-shaped plate structure) and travels in the inverted wedge-shaped plate structure in a similar manner to the light in the inverted wedge-shaped plate, for example, an emergent point of the light 505 from the first micro-prism array is located on the inverted wedge-shaped plate. The condition of the first light source 51 corresponding to the first auxiliary light source 56 is the same as mentioned above.

Figure 7:
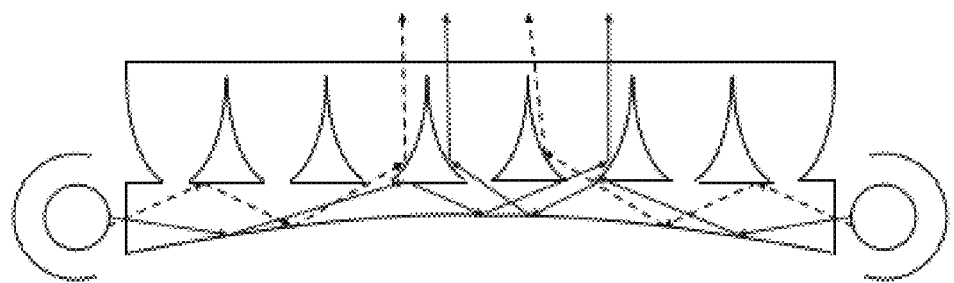
FIG. 7 is a schematic diagram of an optical path of a third structure of the double-light source collimating backlight module in Example 2 of the embodiment of the invention.

FIG. 7 is a schematic diagram of a third structure of the double-light source collimating backlight module. In a solution where a bidirectional wedge-shaped light guide plate is used, the lower interface 572 of the wedge-shaped plate may be non-linear and multi-segmental, and the operating principle of this solution is similar to that in FIG. 6.

Figure 5:
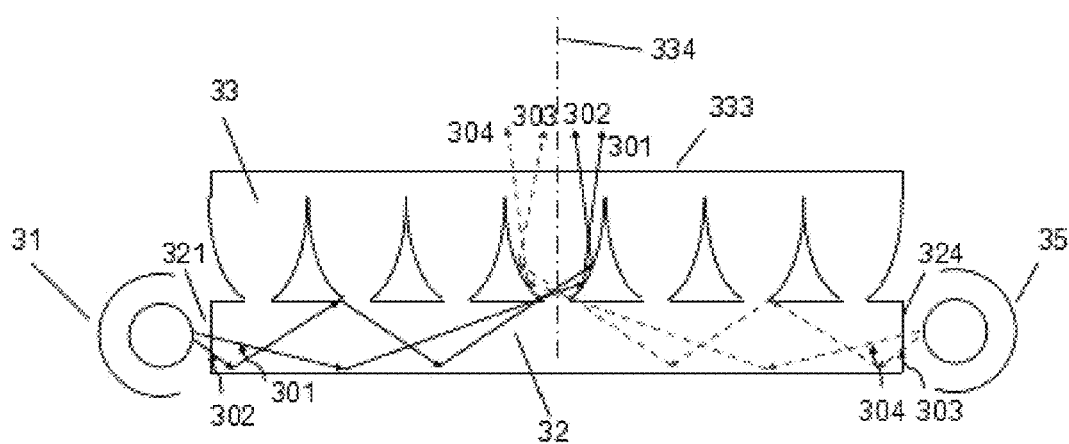
FIG. 5 is a schematic diagram of an optical path of a first structure of a double-light source collimating backlight module in Example 2 of the embodiment of the invention.
Figure 8:
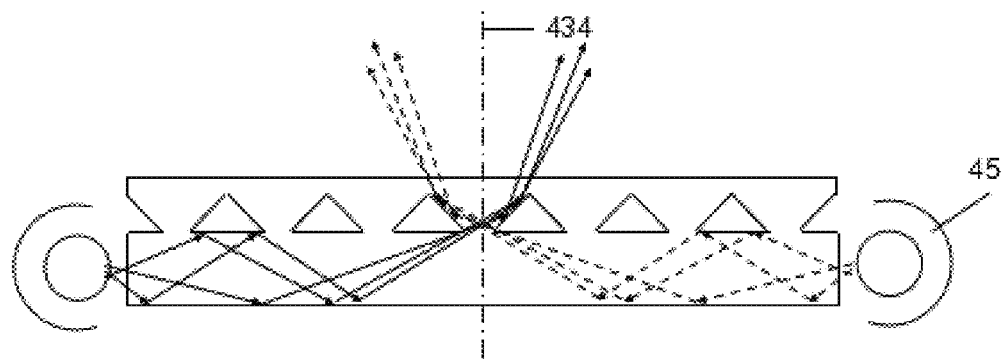
FIG. 8 is a schematic diagram of a structure of a double-light source diffusion backlight module in Example 2 of the embodiment of the invention.

FIG. 8 is a schematic diagram of a double-light source diffusion backlight module, which is basically identical in structure with the backlight module in FIG. 5 and differs from the backlight module in FIG. 5 in that the second reflecting film 44 is replaced with a second auxiliary light source 45.

Figure 9:
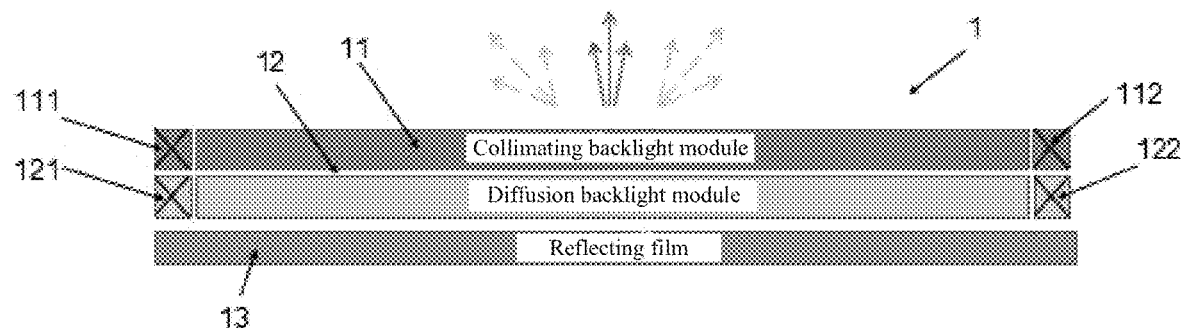
FIG. 9 is a schematic diagram of a first structure of a double-light source backlight module in Example 3 of the embodiment of the invention.

Example 3: As shown in FIG. 9, a bilaterally incident (double-light source) backlight module 1 capable of providing a collimating emitted light and a large-angle (divergent) emitted light comprises a collimating backlight module 11 used for providing the collimating emitted light and serving as the upper backlight module, a diffusion backlight module 12 used for providing the divergent emitted light and serving as the lower backlight module, and a reflecting film 13 disposed below the lower backlight module and used for reflecting stray lights, reflected downward by an optical interface, back to the emitted direction to be reused, to improve the optimal efficiency of the backlight module.

Figure 10:
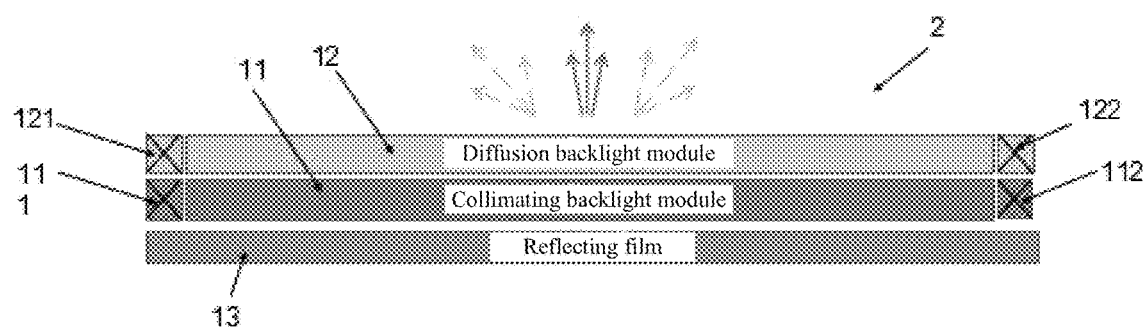
FIG. 10 is a schematic diagram of a second structure of the double-light source backlight module in Example 3 of the invention.

As shown in FIG. 10, a bilaterally incident backlight module 2 capable of providing a collimating emitted light and a large-angle (divergent) emitted light comprises a diffusion backlight module 12 used for providing the divergent emitted light and serving as the upper backlight module, a collimating backlight module 11 used for providing the collimating emitted light and serving as the lower backlight module, and a reflecting film 13 disposed below the lower backlight module. In Example 3 shown in FIG. 10 and FIG. 11, the upper backlight module and the lower backlight module are arranged in the same direction, that is, light sources on the same side of the upper backlight module and the lower backlight module are stacked with one above the other, such as 111 and 121, and 112 and 122.

Figure 11:
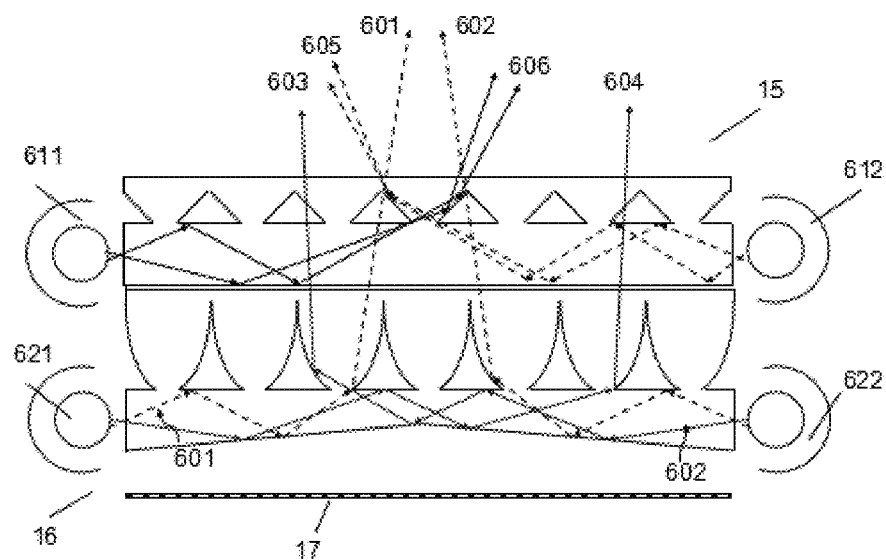
FIG. 11 is a schematic diagram of an optical path of the combination of the diffused backlight module and the collimation backlight module of a second structure of the double-light source backlight module in Example 3 of the invention.

As shown in FIG. 11, a double-light source diffusion backlight module 15 is used as the upper backlight module, a bidirectional wedge-shaped collimating backlight module 16 is used as the lower backlight module, and the upper backlight module 15 and the lower backlight module 16 are combined and disposed above a reflecting film 17. With the lower backlight module 16 as an example, a light 601 emitted by a light source 621 and a light 602 emitted by the light source 622 travel in the same direction after entering the wedge-shaped light guide plate and are refracted out of the lower backlight module 16 when encountering the lower opening of the micro-prism array. Lights 601, 602, 603 and 604 emitted by the collimating backlight module 16 form a collimating beam after passing through the upper backlight module 15, and part of the collimating beam is dispersed due to the haze effect caused by the micro-prism structure of the upper backlight module when the lights 601, 602, 603 and 604 pass through the upper backlight module. Similarly, lights emitted by two light sources 611 and 612 of the upper backlight module 15 travel in the same direction after entering the parallel light guide plate, and are refracted by side surfaces of the micro-prism out of the diffusion backlight module at a large angle when encountering the lower opening of the micro-prism array, such as lights 605 and 606. In this way, a full-angle beam is formed by the lights 601, 602, 605 and 606, and when the upper backlight module 15 is turned off, only the collimated lights 601 and 602 are located in the beam range. The visual angle of the beam can be switched by controlling on/off of the light sources of the upper backlight module 15. In this example, the reflecting film 17 is used for refracting lights leaking from the bottom of the wedge-shaped light guide plate and lights reflected downward by different interfaces of the backlight module to reuse downward emitted light, such that the overall optical efficiency of the backlight module is improved. In addition to the design where the upper backlight module is a parallel plate and the lower backlight module is wedge-shaped, the combination in this technical solution may also adopt the following design: the upper backlight module is wedge-shaped and the lower backlight module is a parallel plate, or the upper backlight module and the lower backlight module are both parallel plates, or the upper backlight module and the lower backlight module are both wedge-shaped.

Figure 12:
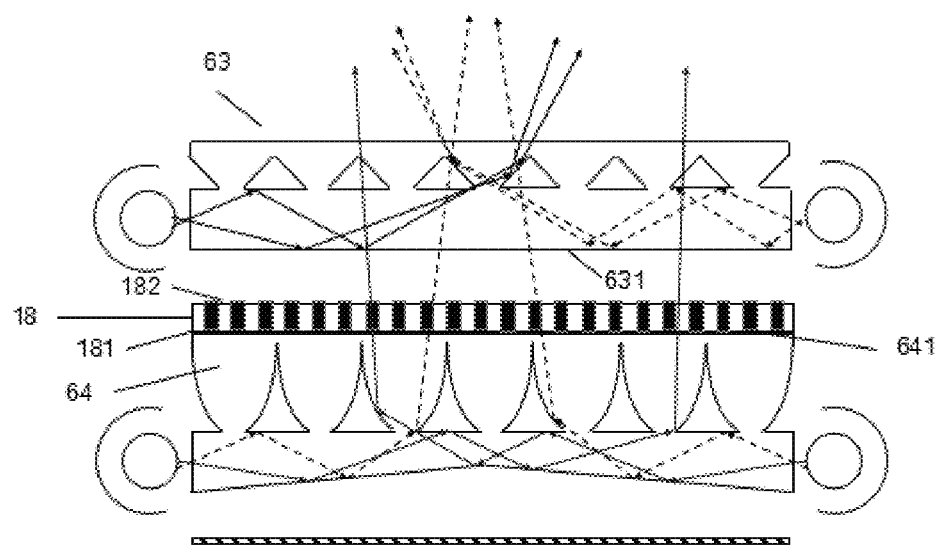
FIG. 12 is a schematic diagram of an optical path of the combination of a diffusion backlight module, an anti-peeping film and a collimating backlight module of a second structure of the double-light source backlight module in Example 3 of the invention.

As shown in FIG. 12, an anti-peeping film 18 is added to the structure in FIG. 12 to further improve the blackness of a collimation (angle) cut-off region (the contrast of the module). In this structure, a lower surface 181 of the anti-peeping film 18 is optically attached to a light-emitting surface 641 of a lower backlight module 64 to reduce the optical loss at the interface; and an upper surface 182 of the anti-peeping film 18 should not be attached to a lower surface 631 of a diffusion backlight module 63 and should be in non-optimal contact with the lower surface 631 of the diffusion backlight module 63.

Figure 13:
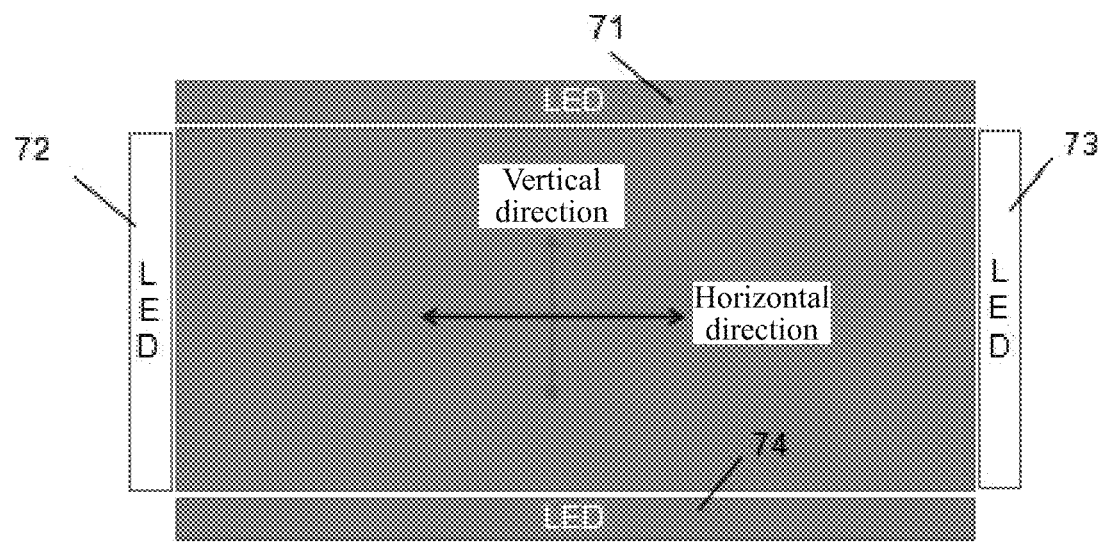
FIG. 13 is a planar structural schematic diagram of the double-light source backlight module with an upper backlight module and a lower backlight module being arranged perpendicularly in Example 3 of the embodiment of the invention.

As shown in FIG. 13, the upper backlight module and the lower backlight module are arranged orthogonally, that is, light sources such as 72 and 73 of one backlight module are arranged in the horizontal direction, and light sources 71 and 74 of the other backlight module are arranged in the vertical direction. With the orthogonal arrangement, the upper backlight module and the lower backlight module can be combined more closely, and mutual interference of the light sources is avoided. The actual haze of the lower backlight module caused by the micro-prism structure of the upper backlight module is reduced under the premise that a compact structural design is realized. The pattern of beams of the combination of the orthogonally arranged backlight modules is similar to that of the combination of the parallelly arranged backlight modules.

Figure 14:
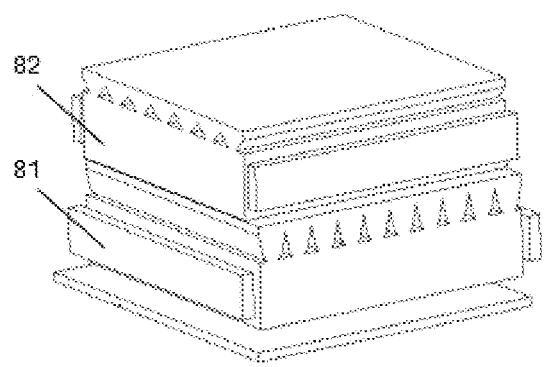
FIG. 14 is a three-dimensional structural schematic diagram of a first structure of the double-light source backlight module with the upper backlight module and the lower backlight module being arranged perpendicularly in Example 3 of the embodiment of the invention.
Figure 15:
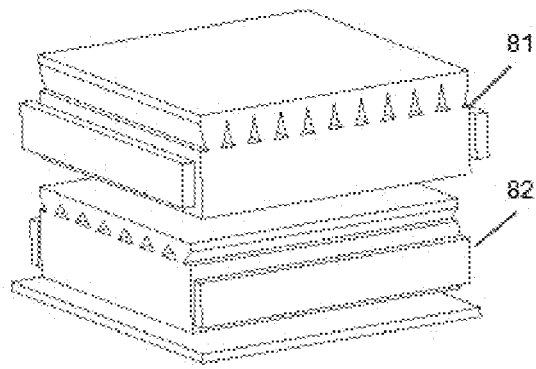
FIG. 15 is a three-dimensional structural schematic diagram of a second structure of the double-light source backlight module with the upper backlight module and the lower backlight module being arranged perpendicularly in Example 3 of the embodiment of the invention.

In the structure illustrated by FIG. 14, an orthogonally arranged collimating backlight module 81 is at the bottom, and a diffusion backlight module 82 is at the top. In the combination illustrated by FIG. 15, the diffusion backlight module 82 is at the bottom, and the collimating backlight module 81 is at the top.

Figure 16:
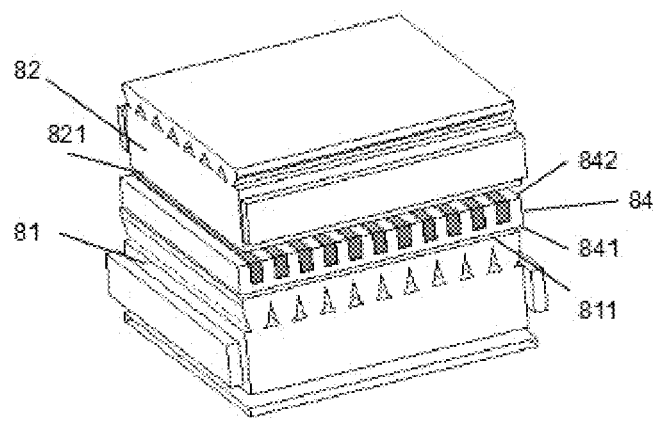
FIG. 16 is a three-dimensional structural schematic diagram of the first structure of the double-light source backlight module with the upper backlight module and the lower backlight module being arranged perpendicularly in case where an anti-peeping film is added in Example 3 of the embodiment of the invention.

As shown in FIG. 16, in the structure using the collimating backlight module 81 at the bottom and the diffusion backlight module 82 at the top, an anti-peeping film 84 is disposed between 81 and 82 to further improve the blackness of a collimation (angle) cut-off region (the contrast of the module). In this structure, a lower surface 841 of the anti-peeping film 84 is optimally attached to a light-emitting surface 811 of the lower backlight module 81 to reduce the optical loss at the interface; and an upper surface 842 of the anti-peeping film 84 should not be attached to a lower surface 821 of the diffusion backlight module 82 and should be in non-optimal contact with the lower surface 821 of the diffusion backlight module 82.

Example 4

Figure 17:
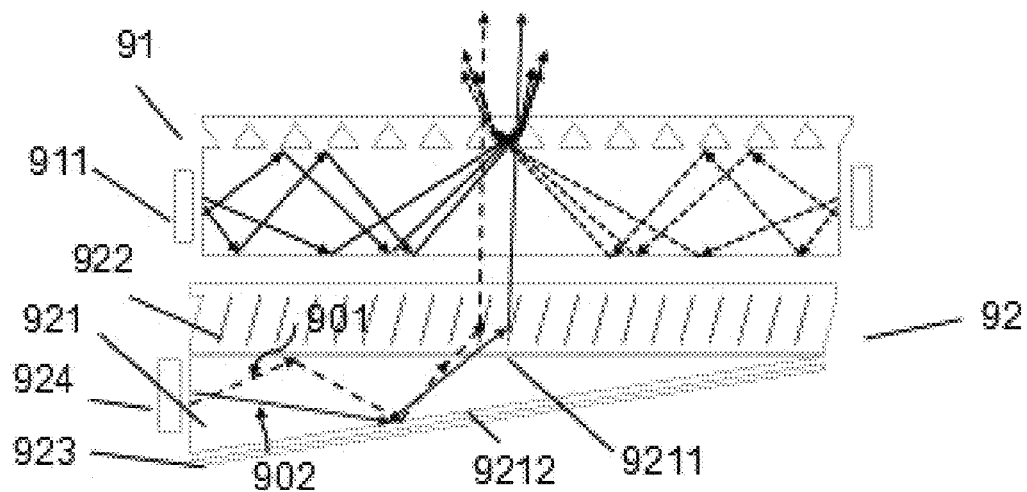
FIG. 17 is a schematic diagram of a first structure of a backlight module in Example 4 of the embodiment of the invention.

As shown in FIG. 17, a non-transparent and full wedge-shaped collimating backlight module 92 is used as the lower backlight module, and a transparent diffusion backlight module 91 is used as the upper backlight module, wherein the upper backlight module and the lower backlight module are arranged in the same direction, that is, light sources 911 and 924 of the two backlight modules are stacked with one above the other. Different from the integrated wedge-shaped module, a rhombic prism film 922, a wedge-shaped light guide plate 921 and a reflecting film 923 in FIG. 17 are separate devices, wherein materials of the rhombic prism film 922 and the wedge-shaped light guide plate 921 have the same or similar refractivity. The operating principle of this structure is as follows: lights 901 and 902 emitted by the light source 924 enter the wedge-shaped light guide plate 921 from a front end and follow the Snell's law of refraction when propagated in the wedge-shaped light guide plate 921 (for example, n=1.58):

$$n_1 \sin \theta_1 = n_2 \sin \theta_2$$

Where, $n_1$ is the refractivity of a medium 1, $\theta_1$ is an incidence angle, $n_2$ is the refractivity of a medium 2, and $\theta_2$ is a refraction angle.

After the lights enter the wedge-shaped light guide plate 921, the angle range of the lights is $\alpha = \pm \arcsin (1/1.58) = \pm 40°$; when the lights are propagated in the wedge-shaped light guide plate 921, the normal angle 90-$\alpha$ between the lights and upper and lower reflecting surfaces 9211 and 9212 of the wedge-shaped light guide plate 921 is greater than or equal to 50°, a total reflection angle is $\gamma = \arcsin (1/1.58) = 40°$, and when 90-$\alpha$ is greater than $\gamma$, the lights meet the total reflection condition and will not be transmitted out of the light guide plate. The angle of the wedge-shaped plate is $\beta$, and the normal angle between the lights and a light-emitting surface 9211 of the wedge-shaped light guide plate 921 will be decreased by $\beta$ every time the lights are reflected until the lights meet the outgoing condition and are transmitted out of the light guide plate. It can be understood that lights entering the rhombic prism film 922 from the light-emitting surface 9211 are transmitted out close to the total reflection angle and are basically in the same direction, that is, regardless of the initial direction of the lights 901 and 902 in the wedge-shaped light guide plate 921, they enter the rhombic prism film 922 basically in the same direction. So, after the lights are refracted by the rhombic prism film 922, a beam with good convergence in a designated direction is formed. This structure is especially necessary in application scenarios with high collimation requirements. The operating principle of the upper diffusion light guide plate 921 is similar to that of above examples. It should be pointed out that because the collimation performance of the full wedge-shaped collimating backlight module is better, the emergent range of the diffusion backlight module will become larger correspondingly to realize seamless full coverage with the emergent beam of the collimating backlight module.

Figure 18:
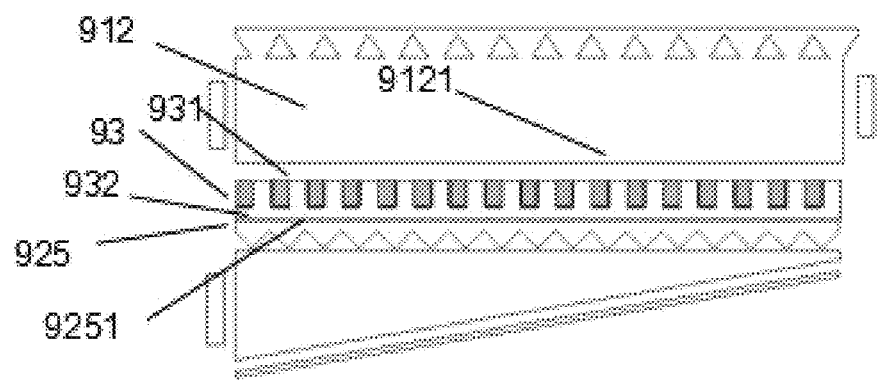
FIG. 18 is a schematic diagram of a second structure of the backlight module in Example 4 of the embodiment of the invention.

As shown in FIG. 18, an anti-peeping film 93 is disposed between the transparent diffusion backlight module 91 and the non-transparent collimating backlight module 92 in the structure illustrated by FIG. 17 to further improve the blackness of a collimation (angle) cut-off region (the contrast of the module). In this structure, a lower surface 932 of the anti-peeping film 93 is optimally attached to a light-emitting surface 9251 of the lower backlight module to reduce the optical loss at the interface; and an upper surface 931 of the anti-peeping film 93 should not be attached to a lower surface 9121 of the diffusion backlight module 912 and should be in non-optical contact with the lower surface 9121 of the diffusion backlight module 912. In this structure, the rhombic prism film above the wedge-shaped light guide plate in FIG. 17 is replaced with a reversed prism film 925, and the operating principle of this structure is similar to that of the structure in FIG. 17, which is to refract lights transmitted out of the wedge-shaped light guide plate in specific directions through total reflection.

Figure 19:
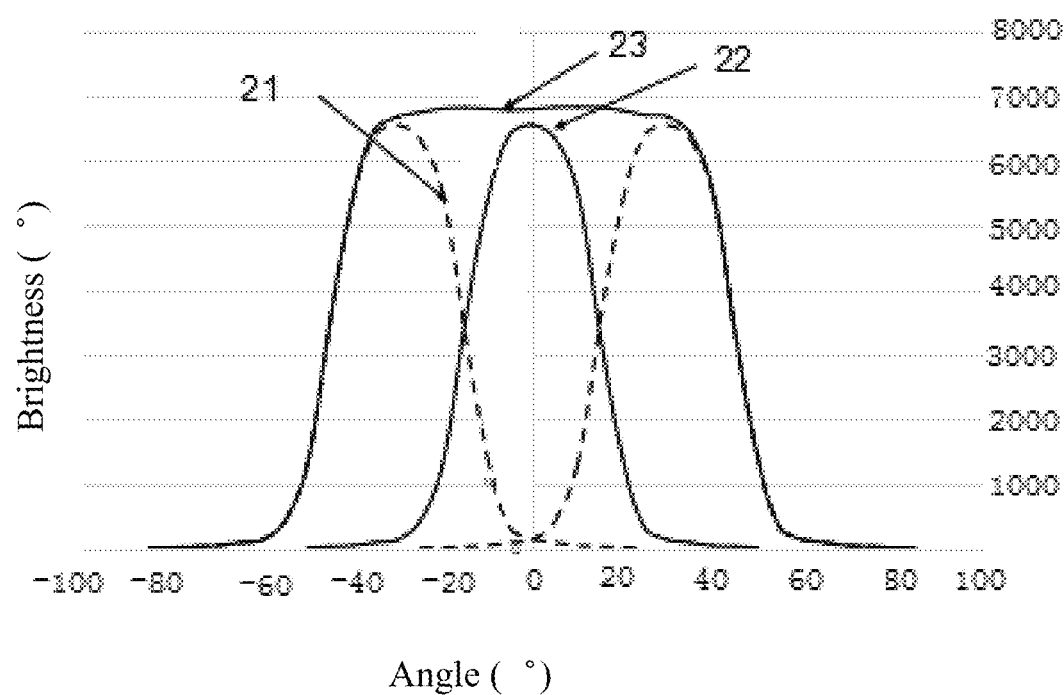
FIG. 19 is a schematic diagram of emitted light spectra of the double-light source backlight module in the embodiment of the invention.

FIG. 19 is a diagram of emitted light spectra the double-light source backlight module in the embodiment of the invention. As can be seen from FIG. 19, when the upper backlight module and the lower backlight module work synchronously, a light contour 23 covering the whole view field is provided by the double-light source backlight module. When the diffusion backlight module is turned off, a dashed light spectrum 21 no longer appears, and the double-light source backlight module only provides an emitted light spectrum 22 in the collimating direction.

What is claimed is:

1. An anti-peeping backlight module, wherein the anti-peeping backlight module with a controllable light angle is formed by stacking an upper backlight module, a lower backlight module and a reflecting film disposed below the lower backlight module, wherein the upper backlight module is a diffusion backlight module, the lower backlight module is a collimating backlight module, and the upper backlight module and the lower backlight module have different properties, wherein the collimating backlight module comprises a first light guide plate and a first light source disposed on a side surface of the first light guide plate, a first micro-prism array is disposed on an upper surface of the first light guide plate and is arranged along a light transmission direction of the first light source, the diffusion backlight module comprises a second light guide plate and a second light source disposed on a side surface of the second light guide plate, a second micro-prism array is disposed on an upper surface of the second light guide plate and is arranged along a light transmission direction of the second light source, wherein the first micro-prism array and the second micro-prism array are orthogonal or parallel to each other.

2. The anti-peeping backlight module according to claim 1, wherein the first light guide plate is a rectangular-shaped plate, the first light source is disposed on the side surface of the first light guide plate, and a first reflecting surface is disposed on a side surface of the first light guide plate opposite to the first light source.

3. The anti-peeping backlight module according to claim 1, wherein the first light guide plate is a rectangular-shaped plate, the first light source is disposed on the side surface of the first light guide plate, and a first auxiliary light source is disposed on a side surface of the first light guide plate opposite to the first light source.

4. The anti-peeping backlight module according to claim 1, wherein the first light guide plate is a wedge-shaped plate, and the first light source is disposed on a side surface of a thick end of the wedge-shaped plate.

5. The anti-peeping backlight module according to claim 4, wherein a wedge angle of the wedge-shaped plate is less than or equal to 5°.

6. The anti-peeping backlight module according to claim 4, wherein a reflecting surface is disposed on a side surface of a tail end of the wedge-shaped plate.

7. The anti-peeping backlight module according to claim 1, wherein the first light guide plate is a bidirectional wedge-shaped plate, and the first light sources are disposed on side surfaces of two thick ends of the wedge-shaped plate.

8. The anti-peeping backlight module according to claim 1, wherein the first micro-prism array is of a trapezoidal-shaped structure or a cup-shaped structure, and is integrated with the first light guide plate.

9. The anti-peeping backlight module according to claim 1, wherein the first micro-prism array is arranged regularly or irregularly.

10. The anti-peeping backlight module according to claim 1, wherein lights light entering the first micro-prism array from the first light guide plate are refracted out of the first micro-prism array in a convergent manner.

11. The anti-peeping backlight module according to claim 1, wherein the second light guide plate is a rectangular-shaped plate, the second light source is arranged on a side surface of the second light guide plate, and a second reflecting surface is disposed on a side surface of the second light guide plate opposite to the second light source.

12. The anti-peeping backlight module according to claim 1, wherein the second light guide plate is a rectangular-shaped plate, the second light source is disposed on a side surface of the second light guide plate, and a second auxiliary light source is disposed on a side surface of the second light guide plate opposite to the second light source.

13. The anti-peeping backlight module according to claim 1, wherein lights entering the second micro-prism array from the second light guide plate are refracted out of the second micro-prism array in a divergent manner.

14. The anti-peeping backlight module according to claim 1, wherein an anti-peeping film is attached to an upper surface of the lower backlight module, and an air gap is reserved between the anti-peeping film and a lower surface of the upper backlight module.

15. The anti-peeping backlight module according to claim 1, wherein the second light guide plate is a rectangular-shaped plate, the second light source is disposed on a side surface of the second light guide plate, a second auxiliary light source is disposed on a side surface of the second light guide plate opposite to the second light source, the first light guide plate is a wedge-shaped plate, the first light source is disposed on a side surface of a thick end of the wedge-shaped plate, and a rhombic prism film is disposed between the first light guide plate and the second light guide plate.

16. The anti-peeping backlight module according to claim 1, wherein the second light guide plate is a rectangular-shaped plate, the second light source is disposed on a side surface of the second light guide plate, a second auxiliary light source is disposed on a side surface of the second light guide plate opposite to the second light source, the first light guide plate is a wedge-shaped plate, the first light source is disposed on a side surface of a thick end of the wedge-shaped plate, and a reversed prism film is disposed between the first light guide plate and the second light guide plate.

17. The anti-peeping backlight module according to claim 1, wherein an anti-peeping film is disposed between the reversed prism film and the second light guide plate.

* * * * *